Dec. 16, 1952     A. J. HORNFECK     2,622,237
CONTROL SYSTEM

Original Filed June 6, 1946     6 Sheets-Sheet 1

INVENTOR.
ANTHONY J. HORNFECK
BY
Raymond W. Jenkins
ATTORNEY

Dec. 16, 1952     A. J. HORNFECK     2,622,237
CONTROL SYSTEM

Original Filed June 6, 1946     6 Sheets-Sheet 3

*INVENTOR.*
ANTHONY J. HORNFECK
BY Raymond D. Jenkins
*ATTORNEY*

Dec. 16, 1952      A. J. HORNFECK      2,622,237
CONTROL SYSTEM

Original Filed June 6, 1946      6 Sheets-Sheet 4

INVENTOR.
ANTHONY J. HORNFECK
BY Raymond D. Jenkins
ATTORNEY

MOTOR OF FIG. 5    MOTOR OF FIG. 6

*INVENTOR.*
ANTHONY J. HORNFECK
BY
Raymond W. Jenkins
ATTORNEY

Patented Dec. 16, 1952

2,622,237

UNITED STATES PATENT OFFICE 2,622,237

CONTROL SYSTEM

Anthony J. Hornfeck, Lyndhurst, Ohio, assignor to Bailey Meter Company, a corporation of Delaware Original application June 6, 1946, Serial No. 674,752, now Patent No. 2,495,844, dated January 31, 1950. Divided and this application July 15, 1949, Serial No. 104,870

9 Claims. (Cl. 323—73)

My invention relates to electrical control circuits and particularly to electrical control circuits utilizing a measurement of a variable quantity, quality, position, or the like as the motivating basis for a control of the same or of another variable. A condition, quantity, quality, position or other variable which may be represented by an electrical value such as resistance, potential or other electrical characteristic may be continuously and instantaneously measured through the agency of the circuit to be described. The measurement so obtained may be used to effect a control of the same or of another variable which may or may not contribute to the magnitude or change in magnitude of the variable being measured.

Representative of variable quantities, conditions and the like to which my invention is directed are such variables as rate of fluid flow, temperature, liquid level, pressure; although the variable may equally as well be the position in space of an object, the throttling position of a valve, or the like.

In the control or combustion or of other processes the time of response (process lag) of the system to a corrective change in the rate of application of an agent, following a departure of the controlled condition from its desired value, depends on various constructional and operating factors. Over-travel, hunting, or the like of a control system results in inefficiency, waste and excessive wear on equipment. To satisfactorily control the operation of different processes and apparatus, several basic types of control are known and are widely used in pneumatic and hydraulic control systems. A principal object of my present invention is the embodiment in electrical and electronic circuits of the proven desirable features of control readily adapted to a wide variety of process systems to be controlled.

By way of example only, I have chosen to illustrate and describe my invention as applied to an electrically heated furnace wherein it is desired to maintain a uniform preselected temperature. It will be understood that such example is representative of a variable condition to be controlled through the application of an agent affecting the condition and is not to be taken as limiting.

The type of apparatus to be controlled frequently dictates the nature of the control which may be economically applied. In the control art two general types of control are recognized which are referred to as "on-off" and "modulating." In "on-off" control the controlled element, such as a fuel supply valve, for example, is in either open or shut position; or an electric heating resistor is turned on or off by a contactor. In "modulating" control the valve is positioned between its extremes of travel to modulate or throttle the rate of flow of fuel through the valve. A modulating control, while preferable, is usually a more elaborate and expensive type and is not readily applicable to controlled elements which have only two possible positions, such as a solenoid operated valve which has only an open and a shut position, or an electric heating resistor element to which the current is either on or off. Such "on-off" control is, however, at one or the other of two extremes and may lead to bad cycling.

So long as temperature is above standard, current to the furnace heating resistors is turned to "off." If the temperature is at or below standard, the current is turned "on." Obviously the full heating effect of the resistor may be greater than is necessary to balance heat input to heat output for maintaining a uniform desired temperature. Preferably the amount of correction to rate of heat input should bear a relation to the extent of departure of temperature from standard. Modulating or throttling control tends to maintain the application of the corrective agent in accordance with the demand.

It is a particular object of my present invention to provide a controller for an "on-off" type of controllable apparatus embodying or incorporating the advantageous features of a "modulating" type of control. Basically, this result is accomplished by varying the proportion of "on-time" to the "off-time," giving the effect of a modulation related to the extent of departure of temperature from standard, and therefore to the actual value of temperature in relation to the standard value.

Figure 1:
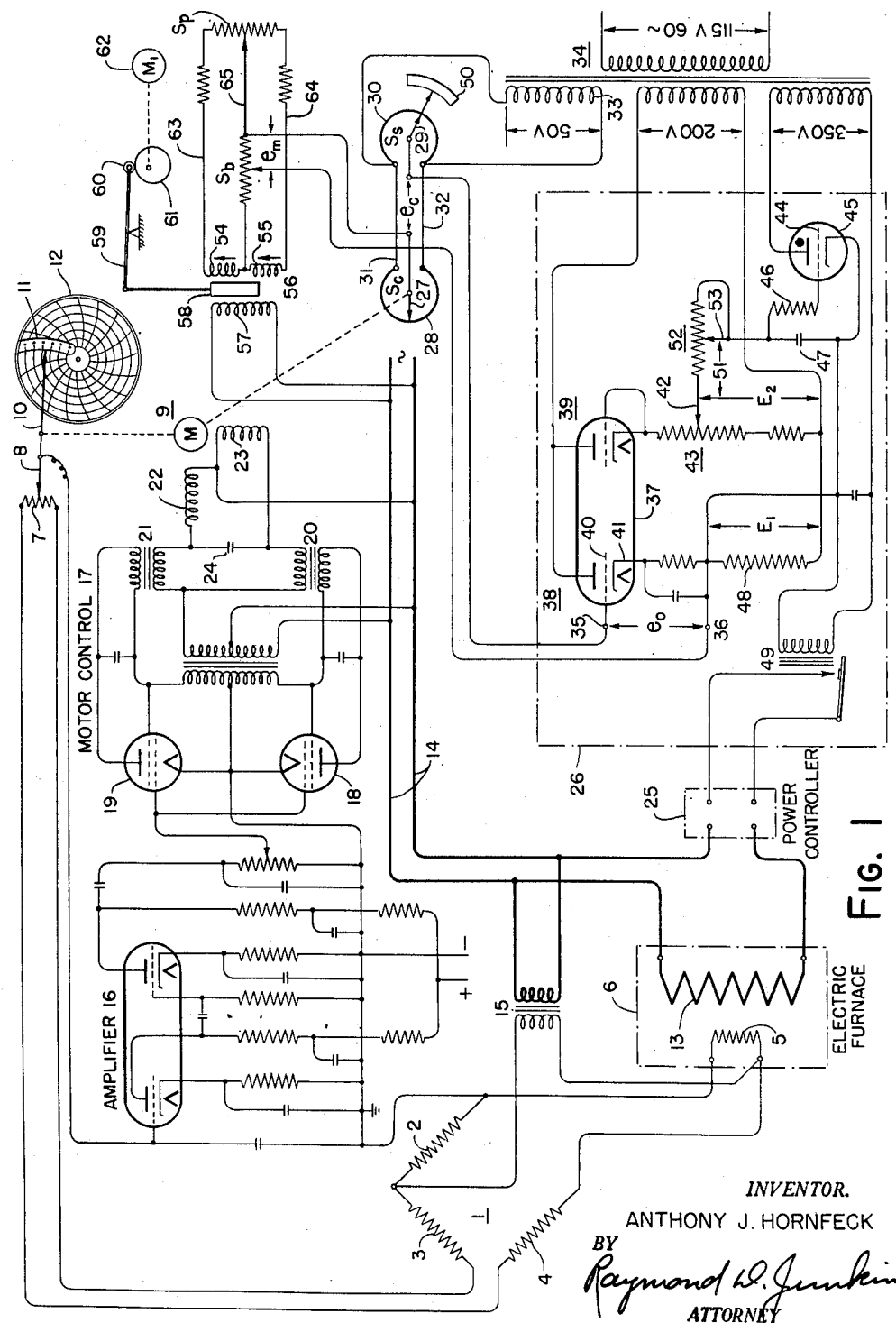
Fig. 1 is a measuring and control system in connection with a resistance thermometer.

All of the figures of the drawing are shown in quite diagrammatic or schematic manner. In Fig. 1 I have shown the amplifier and motor control circuit in detail. I have not felt it necessary to duplicate these details in other figures which illustrate modification of a portion only of the complete circuit in Fig. 1.

Referring now in particular to Fig. 1, I indicate at 1 a phase sensitive A.-C. bridge having fixed resistor arms 2, 3 and 4. The fourth arm 5 of the bridge 1 is a resistance element located in an electric furnace 6 and sensitive to the temperature thereof. For balancing the bridge I provide an adjustable resistance 7 inserted between the arms 3 and 4 and provided with a movable contact arm 8 for proportioning the resistance 7 between the arms 3 and 4.

For positioning the contact arm 8 I provide a motor 9 which also positions an indicator 10 relative to a scale 11 and relative to a revoluble chart 12, thereby providing an instantaneous indication, as well as a continuous record, of the value of temperature to which the resistance arm 5 is sensitive.

The electric furnace 6 is preferably heated by an electric resistance element 13 receiving current from an A.-C. source 14 which also provides alternating current to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of the phase sensitive A.-C. bridge for measuring the resistance of the leg 5 subjected to temperature of the furnace 6, reference may be had to the Ryder Patents 2,275,317 and 2,333,393. The voltage output of the bridge 1, supplied to the amplifier 16, assumes a balance or unbalance and a phase relation relative to the supply voltage dependent upon the magnitude and sense of the unbalance condition of the bridge. The amplifier 16 selectively controls motor tubes 18, 19 which in turn control the amount and direction of unbalance of saturable core reactors 20 and 21 for directional and speed control of the motor 9 adapted to position the arms 8 and 10.

The motor 9 is of an A.-C. type having windings 22 and 23 ninety electrical degrees apart and also having a capacitor 24. When alternating current passes directly through one of the windings and simultaneously through the other winding in series with the capacitor, the motor rotates in predetermined direction and at a speed determined by the extent of unbalance of the saturable core reactors 20, 21. It is not necessary to go into greater detail as to the construction and operation of the amplifier 16 and the motor control circuit 17 as reference may be had to the above mentioned Ryder patents.

In my present invention, in addition to providing an instantaneous indication and a continuous record of the value of temperature to which the arm 5 is subjected, I provide an electrical control of the heat input of the resistor 13 to the electric furnace 6. I have shown in this connection a power controller 25 which forms no part of the present invention. This may be any adaptable power controller for the resistance 13. My present invention resides in an electrical system intermediate the measuring system and the power controller, sensitive to the measuring system, and for turning on and off the power controller 25. Thus, upon departure of temperature within the furnace 6 from that which is desired, the power controller 25 is turned on or off to increase or decrease the heat of the furnace tending to return the departed temperature to its desired value. The actual temperature is continuously indicated on the scale 11 and recorded on the chart 12.

The motor 9, in addition to positioning the contact arm 8 simultaneously positions the contact arm 27 over a slidewire 28. At 29 I indicate a contact arm adapted to be manually positioned along a slidewire 30 for establishing the temperature standard or control point to which the control works, i. e. the temperature value which is desired to be maintained at the sensitive arm 5.

The elements 27, 28, 29 and 30 comprise what I term a balanceable control network including the joining conductors 31, 32. This circuit is supplied with alternating current power through the secondary winding 33 of a transformer 34. Contact arm 27 is positioned relative to the slidewire 28 by the motor 9 representative of actual temperature to which the resistance arm 5 is sensitive. Contact arm 29 is positioned relative to slidewire 30 manually to a point representing the desired temperature. The control circuit including these elements then establishes a signal $e_0$ across the terminals 35, 36 of reversable phase and having a magnitude proportional to the unbalance of the control circuit.

The operation is as follows. If temperature within the furnace deviates from the desired value, then the resistance of the bridge arm 5 changes, causing an unbalance of the bridge 1 in one direction or the other dependent upon whether the actual temperature is above or below the desired temperature. The phase and magnitude of the A.-C. output of the bridge 1 follows the sense and amount of unbalance of the bridge and is applied to the amplifier 16 for control of the motor 9. Motor 9 rotates in predetermined direction and amount determined by the phase and amount of unbalance of the bridge 1 and positions the contact 8 along the slidewire 7 in proper direction to rebalance the bridge. The amount of movement of the contact 8 over the slidewire 7 to bring about such a rebalancing is representative of the deviation of the actual temperature from the desired temperature, and therefore the indicator 10 continuously shows on the index 11 and chart 12 the actual temperature of the furnace.

At the same time the motor 9 has positioned the contact 27 along the slidewire 28 in consonance with the departure of the temperature from the desired temperature. With such movement of the contact arm 27 the control bridge, including the elements 27, 28, 29, 30, 31 and 32 becomes unbalanced and an electrical value $e_0$ is established across the terminals 35, 36 representative of the direction and extent of such unbalance. Such signal is effective to actuate the relay 26 controlling the resistor 13 through the agency of power controller 25 in a direction to return the temperature of the furnace toward the desired standard.

As the temperature (due to a change in heating of the resistor 13) returns toward desired value, the consequent temperature change at the resistance 5 unbalances the bridge 1 and causes the motor 9 to position the contacts 8 and 27 in proper direction and amount until the measuring bridge 1 and the control bridge are again balanced. It is appreciated, of course, that this action may be more or less continuous, i. e. that before the temperature returns completely to its desired standard there may be other influences acting upon the furnace to prevent or to accelerate the return of the temperature to the desired value. In other words, the measuring circuit is continuously indicating the instantaneous temperature of the furnace and the control circuit is continuously regulating the power controller 25 to maintain the temperature at the desired value or standard. I will now describe the operation of the apparatus within the dotted enclosure 26 which I term an electronic relay. Such apparatus is under the control of the signal $e_0$ for regulating the power controller 25.

I have indicated as $e_c$ the unbalance potential which may exist between the contact arms 27 and 29 of the control bridge and which unbalance voltage may be of a phase and magnitude depending upon the direction and extent of unbalance. In describing the operation, I am considering that $e_c = e_0$. In other words, for the present I consider that the unbalance $e_c$ is applied directly to the terminals 35, 36.

The magnitude of the control impulse $e_0$ is proportional to the deviation of the measured quantity from the control setting. The sense of the unbalance depends on whether the deviation is below or above the control setting, and determines the phase or polarity of the control impulse. This impulse is amplified or applied directly to the controller. The direction in which the controller operates to restore the measured quantity to standard is determined by the phase or polarity of the unbalance of the control bridge. A phase discriminatory device 37 is shown as a single envelope tube containing triodes 38 and 39 of which 39 is a rectifier whose function is to supply a reference D.-C. voltage $E_2$ for 38. The voltage $e_0$ at terminals 35, 36 is impressed between the grid 40 and the cathode 41 of triode 38 establishing a D.-C. voltage $E_1$ to be compared to $E_2$.

When the control bridge is in balance ($e_c=0$), i. e. when temperature (as represented by the relative position of 27, 28) is at the desired value (as represented by the relative position of 29, 30) triode 38 conducts a predetermined amount of current resulting in a voltage drop $E_1$. An adjustable contact 42 is manually positioned along a resistance 43 until $E_2$ is slightly less than $E_1$. The voltage difference between $E_1$ and $E_2$ is then applied to the grid 44 of a gas filled tube 45, such as a thyratron, through a resistor 46 and a capacitor 47. The negative voltage thus applied to the grid of the thyratron 45 is just large enough to prevent 45 from firing.

Inasmuch as the relay 26 being described provides an on-off control of the heating element 13, it will be appreciated that I desire to fire tube 45 and energize the mechanical relay 49 for the power controller 25 only when the temperature tends to fall below the desired standard value. When the temperature increases above standard or desired value the tube 45 does not fire or conduct. The unbalance voltage $e_0$, on an increase in temperature above the desired value, is in phase with the plate voltage of triode 38 and gives an increase in plate current over balance condition. This results in an increased voltage drop $E_1$ across the resistor 48.

When the temperature decreases from the standard the control bridge becomes unbalanced and a voltage $e_0$ available across the terminal 35, 36 is supplied to the grid 40 of discriminator triode 38. Such voltage is out of phase with the plate voltage of 38 so that the plate current is reduced and $E_1$ becomes less than is balanced by $E_2$. This reduces the negative voltage applied to the grid of thyratron 45 which fires, completing the circuit to energize relay 49.

Thus the relay 26 is sensitive to the phase of the voltage $e_0$ or to the direction of unbalance of the control bridge, which is the same as saying that the relay 26 is sensitive and responsive to a departure of actual temperature above or below the desired value of temperature. The system so far described comprises an on-off control. When temperature decreases below the desired value, then the thyratron 45 is fired, the relay 49 is energized and the power controller 25 is so activated as to increase the heat applied to the furnace 6 so that the actual temperature affective at 5 will be raised toward the desired value. If the temperature increases above the desired value the control bridge becomes unbalanced in opposite sense, applying a voltage $e_0$ of opposite phase to the relay circuit 26, thereby shutting off the thyratron 45 to shut off the heat applied to the furnace 6.

The "control point" as it is sometimes termed in this art is the desired or "standard" temperature value indicated on a scale 50 by hand adjustment of the contact pointer 29 along the slidewire resistance 30.

I will now describe the particular feature of my present invention wherein the proportion of "on-time" to "off-time" may be varied automatically to include in a basic "on-off" control system certain advantageous features of the "modulating" type of control systems. I accomplish this by modifying the control bridge unbalance signal $e_c$ by a modulating signal $e_m$ to the end that the signal $e_0$ applied to the terminals 35, 36 is equal to $e_c \pm e_m$.

Basically the system consists of introducing a periodically cycling signal $e_m$ in series or superimposed with the signal $e_c$ obtained from a deviation of a control variable from standard. The result signal $e_0$ is applied either directly or through the medium of an amplifier or electronic relay to operate an on-off controller, such as an electric contactor, solenoid valve, or the like.

The superimposed signal $e_m$ is the unbalance voltage of a modulating bridge including an adjustable resistance element $S_p$ and the secondary winding 54, 55 of a movable core transformer 56. The movable core transformer 56 has an alternating current energized primary winding 57 variably coupled to the secondaries 54, 55 by means of a movable magnetic core member 58, which is slowly reciprocated back and forth across a central coupling relation with the windings 57, 54 and 55.

For cyclically positioning the core 58 I provide linkage 59 having a roller arm 60 riding an eccentric disc or cam 61 driven synchronously by a motor 62. The shape of the cam 61 is relatively immaterial and may be provided with lobes to allow more than one oscillation per revolution if desired. Furthermore, the shape of the cam 61 may be such as to introduce linear or non-linear reciprocation of the element 58 between the windings it serves to couple inductively.

Joining the element $S_p$, 54 and 55 into a bridge net-work are outer conductors 63, 64 and a conjugate conductor 65. One end of the conductor 65 joins the mid-point of the aiding secondaries 54, 55 and the other end forms a movable contact arm engageable with the resistance $S_p$. Interposed in the conductor 65 is a resistance $S_b$ across which the unbalance voltage $e_m$ is taken in variable amount manually adjustable.

The magnetic core 58 is synchronously reciprocated at a slow frequency by the motor 62. Preferably, this is about one complete cycle per minute, although the minimum frequency should be several times as great as the natural frequency of hunting of the control system. The core is symmetrical about the center of the assembly of windings 54, 55, 57 so that when the position adjustment $S_p$ is at 50%, or mid-point, the unbalance voltage $e_m$ will build up to maximum and decay to zero, first in phase and then out of phase with the supply voltage, which latter is the same as the plate voltage of the relay tube 38.

Under this condition and with the control bridge 27, 28, 29, 30, 31 and 32 perfectly balanced i. e. $e_c=0$, the relay 49 will be "on" exactly half the time. A deviation in the measured variable (temperature) from the standard desired will produce a control voltage $e_c$ alternately in phase and out of phase with the superimposed periodic signal $e_m$. As a result the ratio of duration of the "in" phase to the "out" of phase signal is modified by the magnitude and phase of $e_c$. Hence if the controlled variable (temperature) is down from standard the "on" period of the relay 49 will increase in proportion to the magnitude of the deviation.

Figure 2:
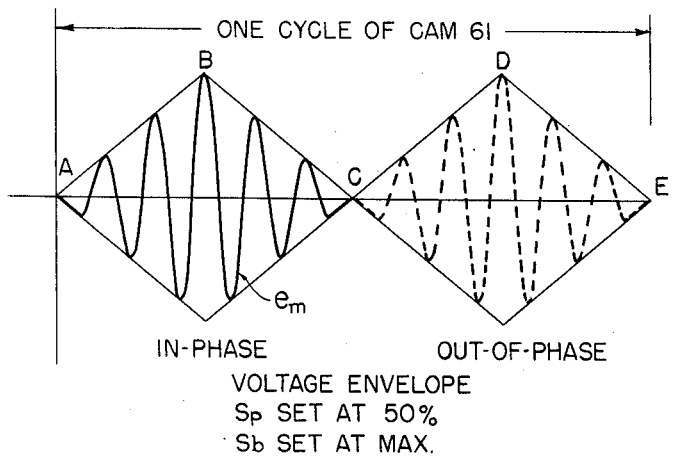
Figs. 2, 2A and 3 are graphs of electrical characteristics in connection with Figs. 1 and 4.

Fig. 2 depicts a typical voltage envelope for the signal $e_m$ for one complete cycle of the cam 61, i. e. for one complete reciprocation cycle of the core 58 coupling the energized primary winding 57 with the aiding secondary windings 54, 55. Assume that the core 58 is at exactly the inductive mid-point of the windings corresponding to A (Fig. 2). The unbalance voltage $e_m=0$ in phase and magnitude. As the core moves away from neutral (A toward B in Fig. 2) a sixty cycle alternating current voltage $e_m$ is developed, growing at a uniform rate from zero at A to a maximum at B, and of one phase which I designate as in-phase. As the core reverses its direction of motion and moves back toward neutral position the in-phase voltage $e_m$ decays to zero (B to C). It will be appreciated that the curves drawn within the envelope A—B—C of Fig. 2 are representative only and are a part only of the eighteen hundred alternations occurring in the one-half minute half cycle of cam 61.

As the core 58 passes the neutral point the signal $e_m$ passes through zero in magnitude (C) and reverses in phase producing an out of phase signal of magnitude growing along C—D and decaying along D—E to zero. While actual values depend upon different circumstances, I may say that the maximum value of the signal $e_m$ will be about 2 volts while the effective value of the signal (the R. M. S.) will usually be about one volt under the conditions of $S_p$ set mid-point and $S_b$ set at MAX. These are the conditions indicated as a premise for Fig. 2.

Figure 2A:
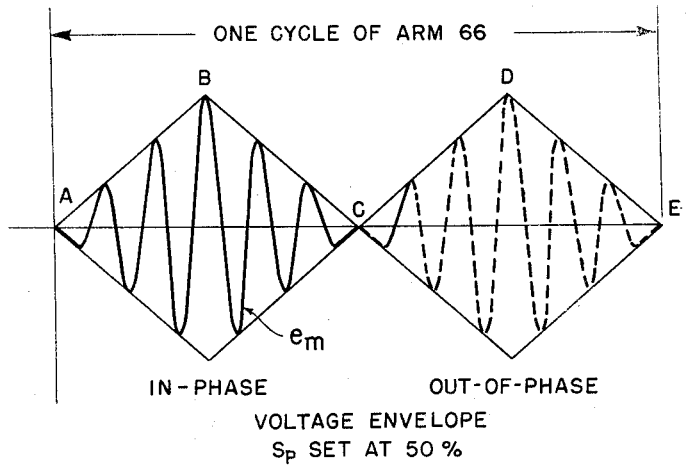
Figure 4:
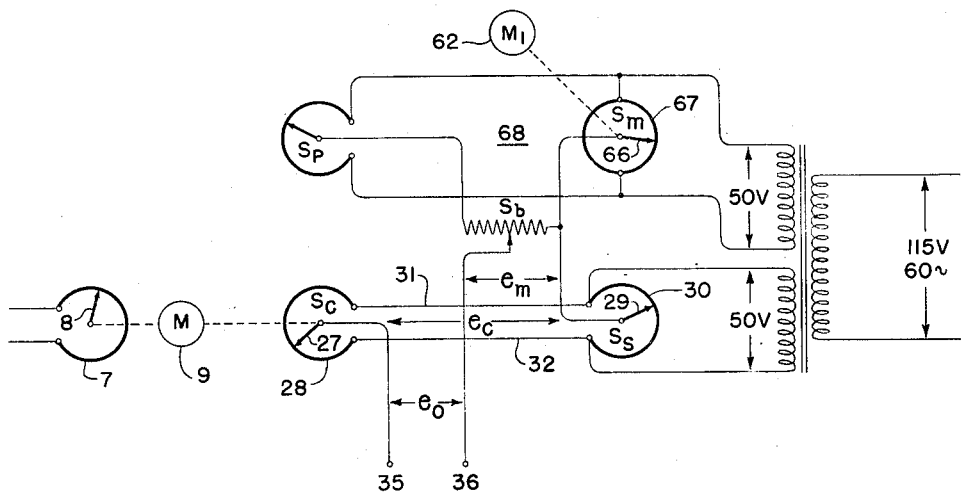
Fig. 4 illustrates a modification of a portion only of Fig. 1.

Fig. 2A is similar to Fig. 2 in depicting a voltage envelope but it shows the voltage envelope developed by the arrangement of Fig. 4. Thus the horizontal dimension of the diagrammatic envelope is for a cycle of an arm 66 later to be referred to. The purpose of Fig. 2A is to show that the same general nature of voltage envelope is developed with the embodiment of Fig. 4 as I have just explained is developed through the embodiment of Fig. 1.

Figure 3:
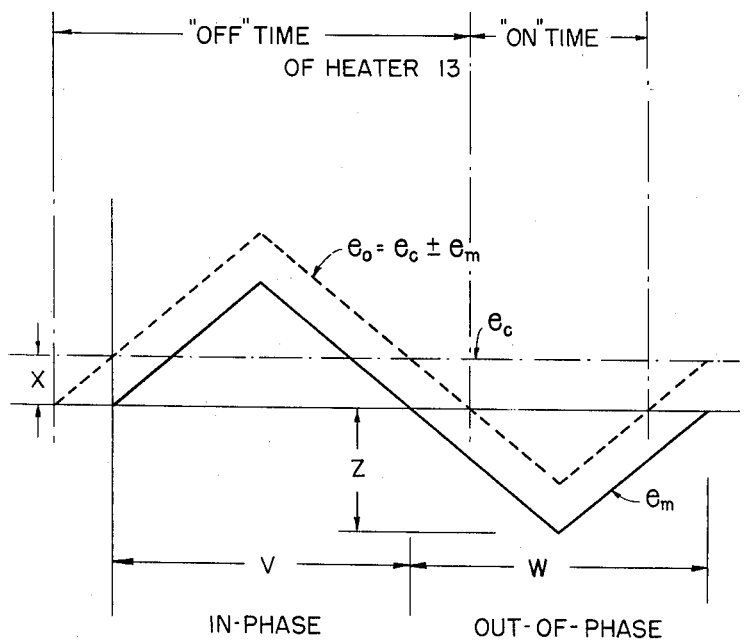

As clearly shown in Fig. 1 the modulating signal $e_m$ is superimposed on the control signal $e_c$ to produce the final signal $e_0$ which is applied to the terminals 35, 36. These two signals are applied in series so that $e_0=e_c \pm e_m$. Refer now to Fig. 3. Herein I show in somewhat schematic manner the production of the final signal $e_0$ for one complete time cycle of cam 61. Although of alternating current, I have assumed that the unbalance voltage $e_c$ has a uniform effective value of X above zero value base line. The full cycle of growth and decay in value of $e_m$ is shown in solid line. The resultant signal $e_0=e_c \pm e_m$ is shown dotted. For the examples given, the ratio of "on-time" to "off-time" of the heater 13 is about .43.

As previously mentioned, the voltage $e_0$ at terminals 35, 36 is impressed between the grid 40 and cathode 41 of triode 38, whose plate voltage is of supply phase. The relation of the two voltages as to phase and magnitude controls the D.-C. voltage $E_1$ which is to be compared to $E_2$. When the signal voltage $e_0$ is out of phase with the plate voltage of triode 38, the plate current is reduced and $E_1$ becomes less in comparison with $E_2$. This reduces the negative voltage applied to the grid of thyratron 45, completing the circuit to energize relay 49 and turning "on" the resistor (heat) 13. Thus the "out-of-phase" time of signal $e_0$ is the "on" time of supplying heat to the furnace 6. Obviously the arrangement could be reversed if desired.

The maximum value Z (Fig. 3) of $e_m$ may be varied by manually moving the contact along resistance $S_b$ to pick off a desired portion of the unbalance in conductor 65. The magnitude of the "proportioning band" depends on the maximum value of $e_m$ and so can be adjusted simply by means of the $S_b$ potentiometer. The ratio of the "in-phase" to the "out-of-phase" signal $e_m$ (V/W in Fig. 3) may be readily and accurately adjusted by moving the contact 65 along the resistance $S_p$.

In Fig. 2 I have shown the boundary of the voltage envelope as comprising straight lines, a result which would be produced if the cam 61 is shaped to have a uniform rise and fall, thus providing a linear relation between movement and voltage. Under the same conditions the curves of Fig. 3 are straight lines. It will be appreciated that if the cam 61 is an off-center disk or eccentric, the relation will be sinusoidal and the boundary of the envelope of Fig. 2 as well as the $e_m$ and $e_0$ curves of Fig. 3 will emulate wave forms. I indicate here no distinct preference in the shape of cam 61 but believe that this may well be chosen differently for different types of processes and systems to be controlled. It is my contemplation that the cam 61 may be so shaped as to develop a desirable outline for the envelope of Fig. 2 and for the curves of Fig. 3. This provides one of the adjustable features of my invention along with possible variation in speed of rotation of the cam 61, as well as the possibility of providing said cam with a number of lobes of desired shape.

In Fig. 4 I show a modification of a part only of the complete circuit of Fig. 1. Inasmuch as this particular modification encompasses a variation only in the method of establishing a modulating signal $e_m$ it does not appear necessary to duplicate the measuring and controlling circuits of Fig. 1. It appears sufficient to describe how I propose to apply to the terminals 35, 36 a signal $e_0$ which is a composite of the signals $e_c$ and $e_m$ where the latter is cyclically produced in a manner somewhat different than is shown in Fig. 1.

In this modification the reciprocating magnetic core 58 is replaced by a resistance bridge modulator comprising a 360° slidewire 67 tapped at two points 180° apart. The contact arm is driven by a synchronous motor 62 and moves at a uniform rate along the slidewire 67, alternately unbalancing the modulating bridge 68 in one direction or the other. The unbalance voltage $e_m$ provides an envelope having the characteristics of Figs. 2A and 3 with one complete cycle per revolution of the contact 66 over the slidewire 67.

This modification has certain advantages and certain disadvantages over that of Fig. 1. It can be made into a very compact unit which can be located at will. On the other hand, it has the disadvantage of a sliding open contact as compared to the inductive coupling of Fig. 1. If the slidewire 67 is accurately wound for linearity, the timing of the device will be a very accurate function of the position of the adjusting slidewire $S_b$. This may be used to accurately control the average rate of change of some controlled variable as illustrated in Fig. 5 which will now be explained.

Figure 5:
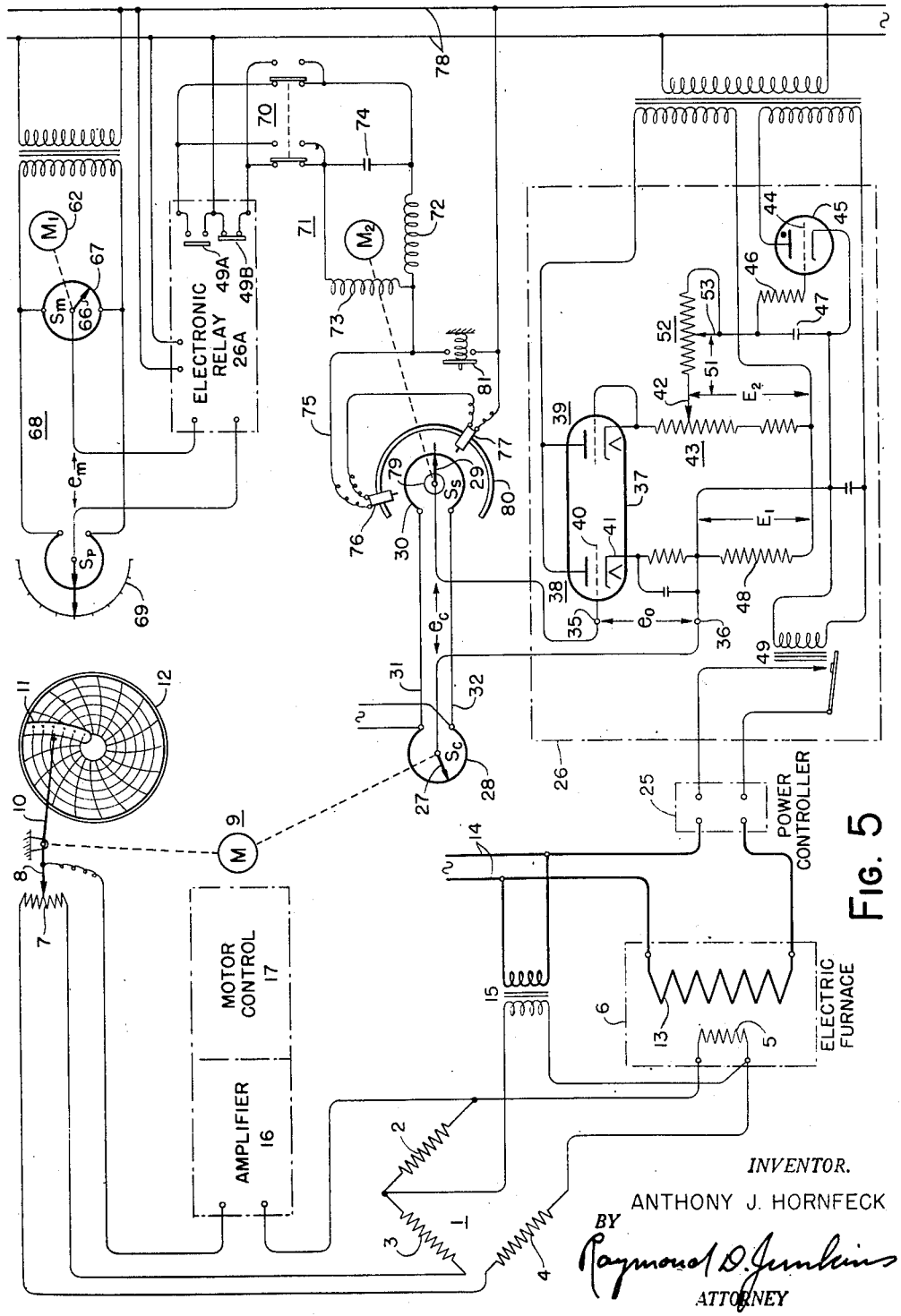
Fig. 5 is a modification of Fig. 1.

Certain elements of Fig. 5 are the same as those of Figs. 1 and 4 and bear the same reference numerals. A modulator 68 includes the potentiometer $S_m$ having a continuous slidewire 67 tapped at two points 180° apart and a contact arm 66 synchronously rotated around the slidewire 67 through the agency of a motor 62. The adjustable potentiometer $S_p$ is provided with an index 69 which may be graduated in terms of "rate." As previously explained, the signal $e_m$ produced by the modulator bridge 68 fits an envelope such as shown in Fig. 2A of linear growth and decay of voltage first "forward-phase" and then "reverse-phase." When the potentiometer $S_p$ is at neutral, the ratio of "forward-phase" to "reverse-phase" is .50. Movement of the adjustment $S_p$ will vary the ratio of "forward-phase" to "reverse-phase" signal $e_m$.

The signal $e_m$ is applied to an electronic relay 26A similar to the relay 26 of Fig. 1, but provided with a normally open contact 49A and a normally closed contact 49B. The contacts 49A, 49B are connected through a two-position switch 70 to control direction of rotation of a capacitor-run motor 71 having windings 72 and 73, as well as a capacitor 74. A common terminal of the windings 72, 73 is joined by a conductor 75 in series through limit switches 76, 77 to one side of a power source 78.

The control bridge producing the unbalance signal $e_c$ includes the control potentiometer $S_c$ adjusted by the motor 9 along with the measuring potentiometer 7, 8. The "standard" potentiometer $S_s$ includes the resistance 30 and a contact arm 29, the latter adapted to be positioned by the motor 71 through the agency of a friction drive 79 in such manner that the contact arm 29 may be manually moved through the friction drive 79 relative to the motor 71. The arm 29 has a proper extension adapted to engage the limit switches 76, 77 which are individually mounted in an adjustable manner upon a track 80 which encircles the slide-wire 30. The arrangement is such that the limit switches 76, 77 may be separately, manually positioned along the track 80 to define the limits of travel of the contact arm 29 along the slidewire 30. Due to the friction drive 79, the motor 71 may cause the arm 29 to engage either of the limit switches 76 or 77 and thereafter to not stall or damage the motor 71. The arrangement described provides a means for smoothly and uniformly varying the "standard" to which the control system is to operate. This is accomplished by a smooth continuous movement of the arm 29 along the slidewire 30 whereby the value $S_s$ is continuously varied and at a "rate" dependent upon the proportion of the time that motor 71 is operating in one direction, i. e. depending upon the signal $e_m$.

In Fig. 5 I have disclosed a ready means for controlling in accordance with a preselected rate of change in the variable, and to maintain the variable at such a preselected rate of change in either an increasing or a decreasing manner. I have provided a ready means for adjustably varying both ordinates of the plot of the variable against time, namely, an adjustment of the extreme values of the variable and of the slope of the increase or decrease. I have further provided ready means for reversing the trend of control at the previous rate or for thereafter manually varying the rate as desired. Inasmuch as certain particular features disclosed herein in Fig. 5 are disclosed in my parent Patent No. 2,495,844 and are also disclosed and claimed in my divisional Patent No. 2,593,562, it appears unnecessary to here go into a further detailed explanation of the showing of Fig. 5.

Figure 6:
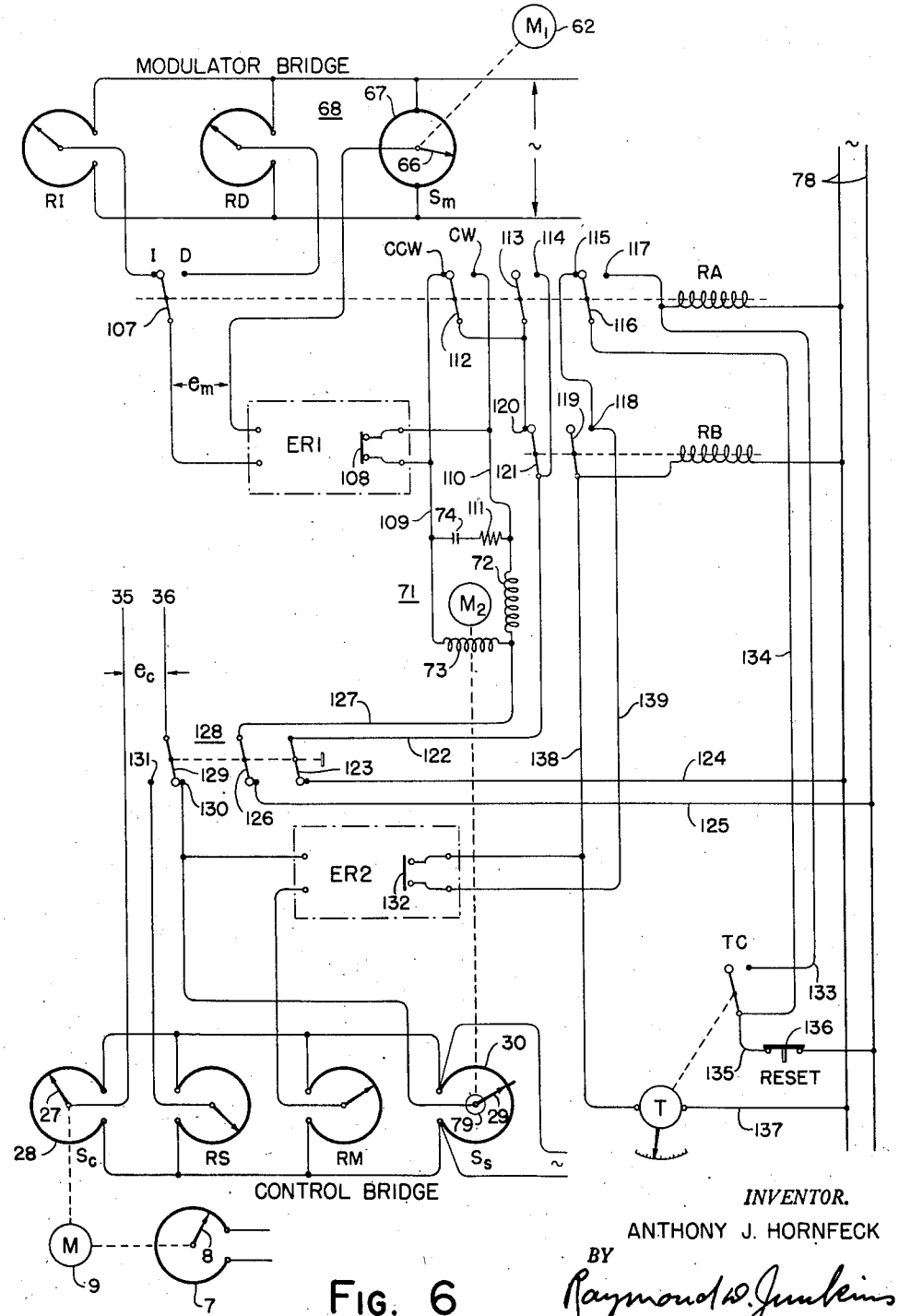
Fig. 6 is a circuit diagram of a modification of a part of Fig. 1.

In Fig. 6 I show a modification of the arrangement of Fig. 5. The arrangement is such as to provide the possibility of automatically performing a complete control cycle or of selectively utilizing hand control. Fig. 6 shows the complete circuit intermediate the measuring slidewire 7, 8 and the output signal supplied to terminals 35, 36.

I show the modulator bridge 68 (producing the signal $e_m$) as having a "rate of increase" potentiometer RI and "rate of decrease" potentiometer RD in addition to the synchronously driven potentiometer $S_m$. The potentiometers RI and RD are selectively included in the bridge circuit 68 by a contact arm 107 engaging either contact I or contact D in the alternate positions of a relay RA. The potentiometers RI and RD respectively refer to and preset the rate of increase or rate of decrease of the variable, namely, in this case temperature. These potentiometers RI and RD are hand adjusted with reference to graduated scales bearing the same titles.

The premise used is that the control is operating in an increasing temperature direction and with arm 107 contacting at the point I with the relay RA deenergized. This predicts that the modulator bridge 68 includes the elements RI and $S_m$ but does not include the element RD. The output of bridge 68, namely, signal $e_m$, produces a "forward-phase" and a "reverse-phase" signal similar to that shown as a voltage envelope in Fig. 2A.

Figure 7:
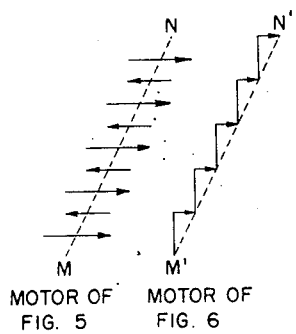
Fig. 7 is a diagram comparing the operation of the motors of Figs. 5 and 6.

The signal $e_m$ is applied to an electronic relay ER1 having a normally closed contact 108, which is connected directly across the conductors 109, 110 of the motor 71. The contact 108 parallels the motor capacitor 74 and a resistance 111, for shorting out the same (when closed) and plugging the motor. Direction of rotation of motor 71 is either clockwise or counterclockwise, dependent upon whether the contact arm 112 of the relay RA engages CCW or CW. As shown, the motor is connected for CCW rotation during the time portion of the time the contact 108 is open. As previously explained, the proportion of "open" to "closed" time of the contact 108 is related to the relation of "forward-phase" to "reverse-phase" of the signal $e_m$. Inasmuch as the motor 71 rotates only when the contact 108 is open, and then only in CW or CCW direction, the motor operation differs somewhat from that previously described. Referring to Fig. 7, it will be observed that the progression of slope MN is accomplished by the motor of Fig. 5 as a difference between CW and CCW alternate movements of the motor. In other words, as previously explained, the motor rotates a small amount CW and then a small amount CCW alternately, and the progression is by the difference of said movements, both as to slope (rate) of the line and the direction of preponderance determines the direction of movement. On the other hand, the motor of Fig. 6 moves only in a single direction and inches along by the duration of the $e_m$ signals which "open" contact 108. Those $e_m$ signals which "close" contact 108 short the capacitor 74 and plug the motor to a stop. Direction of rotation is controlled entirely by the position of the contact arm 112 engaging either CCW or CW. In the example being described in connection with Fig. 6, the motor 71 is rotating CCW at a rate determined by the position of RI and upwardly along the increase line of M'N' of Fig. 7.

Figure 8:
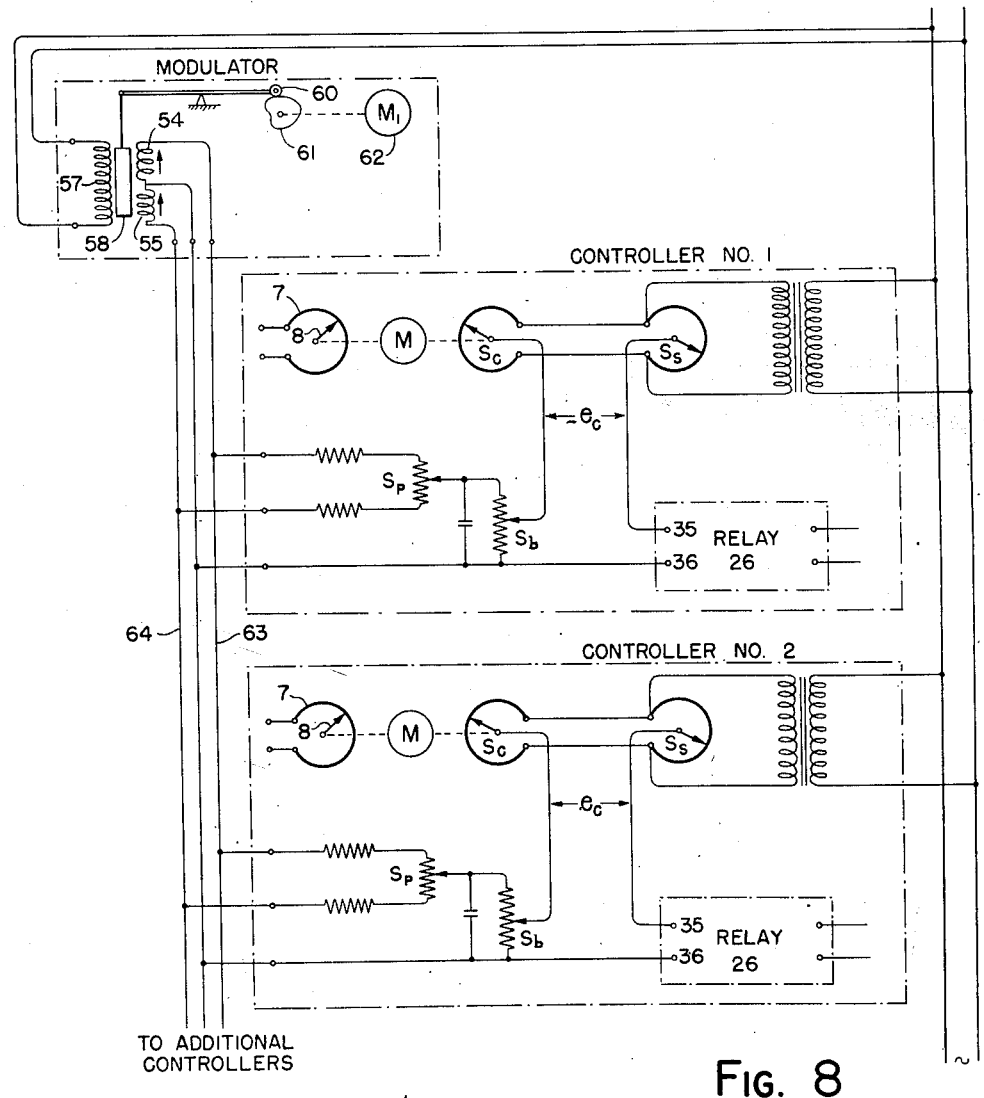
Fig. 8 illustrates how the circuit of Fig. 1 may be pluralized.

In Fig. 8 I show a modification of Fig. 1 wherein a single modulator may serve a plurality of controllers. In view of the explanation of Fig. 1, it seems unnecessary to go into detail as the circuit of Fig. 8.

It will be appreciated from the above detailed description that my invention has wide application and is not limited to the specific examples illustrated and explained. While I have described a single embodiment comprising the control of an electric furnace, it will be appreciated that the invention is equally applicable to fuel fired furnaces or in fact to the control of other variables than temperature.

The present application is a division of my copending parent application S. N. 674,752 filed June 6, 1946, now Patent 2,495,844, granted January 31, 1950. Figs. 1, 2, 3, 4, 6, 7 and 8 of this application are copies of Figs. 1, 2, 3, 4, 9, 12 and 13 respectively of said parent application.

References may also be made to my copending application S. N. 68,027 filed December 29, 1948, as a division (now Patent No. 2,593,562) of the said parent application S. N. 674,752. Figs. 2A and 5 of the present application are duplicates of Figs. 2 and 1 respectively of said divisional application 68,027. Fig. 5 herein includes the disclosure of Fig. 5 of said parent application.

What I claim, and desire to secure by Letters Patent of the United States, is:

1. Signal generating means for cycling control systems comprising in combination, a bridge network including a pair of electric elements providing control means for the bridge output, a source of alternating current for the bridge, a movable member positionable relative to and cooperating with said elements to energize the bridge from said source with a potential smoothly growing and decaying alternately in opposite phases when the member is positioned cyclically relative to the elements, a potentiometer resistor connected in shunt to said elements, a slider on said potentiometer resistor, an output signal circuit extending from said slider and from a selected potential point on said elements, and motive means arranged to position the movable member cyclically at a uniform rate relative to the elements.

2. Signal generating means for cycling control systems comprising in combination, a bridge network including a pair of electric elements providing control means for the bridge output, a source of alternating current for the bridge, a movable member positionable relative to and cooperating with said elements to energize the bridge from said source with a potential smoothly growing and decaying alternately in opposite phases when the member is positioned cyclically relative to the elements, a potentiometer resistor connected in shunt to said elements, a slider on said potentiometer resistor, a conductor joining said slider and a selected potential point on said elements, a second resistor in said conductor, a second slider adjustable over the second resistor, and output signal circuit extending from one end of the second resistor and from the second slider, and motive means arranged to position the movable member cyclically at a uniform rate relative the elements.

3. The combination of claim 1 wherein the electric elements are electrically symmetrical.

4. The combination of claim 1 wherein the slider is hand adjustable to preselect the ratio of bridge energization at one phase to that at the other phase in a given time.

5. Signal generating means for cycling control systems comprising in combination, a bridge including a 360° slidewire, a source of A.-C. connected to said bridge and wire at points 180° apart, a slider movable at uniform rate over said wire, motive means, positioning the slider cyclically over said wire, a potentiometer bridging said source, a slider on said potentiometer, and a signal circuit extending from said sliders.

6. Signal generating means for cycling control systems comprising in combination, a bridge including a 360° slidewire, a source of A.-C. connected to said bridge and wire at points 180° apart, a slider movable at uniform rate over said wire, motive means positioning the slider cyclically over said wire, a potentiometer bridging said source, a slider on said potentiometer, a conductor joining said sliders, a resistor in said conductor, a third slider adjustable over the resistor, and a signal circuit extending from said third slider and from one end of the resistor.

7. Signal generating means for cycling an "on" and "off" control system including in combination, a pair of like secondary windings, a resistor, means connecting said windings and resistor in a closed series circuit, a slider on said resistor, an output circuit extending from the slider to a point between said windings, an A.-C. energized primary symmetrically disposed in relation to the secondaries, a core movable relative to said primary to oppositely vary the inductive relation of the secondaries to the primary, and means to oscillate said core through its path periodically at a uniform rate from a position inducing zero potential in the secondaries to maximum of one phase to zero to maximum in opposite phase repeatedly.

8. Signal generating means for cycling an "on" and "off" control system including in combination, a movable core transformer having a pair of like secondary windings, an A.-C. energized primary for the secondaries, a resistor, means connecting said windings and resistor in a closed series circuit, a slider on said resistor, a second circuit extending from the slider to a point between said windings, a core cyclically movable relative to the primary and secondary windings for inductively coupling them, and motive means to move the core at a uniform rate from a position inducing zero potential in the secondaries to maximum of one phase to zero to maximum in opposite phase repeatedly.

9. The combination of claim 8 including a second resistor in the second circuit, a second slider adjustable over the second resistor, and an output circuit extending from said second slider and from one end of the second resistor.

ANTHONY J. HORNFECK.

REFERENCES CITED

The following references are of record in the file of this patent:

UNITED STATES PATENTS

| Number | Name | Date |
|---|---|---|
| 1,764,347 | Pullwitt | June 17, 1930 |
| 2,432,422 | Hornfeck | Dec. 9, 1947 |
| 2,491,606 | Dickey et al. | Dec. 20, 1949 |